US007093631B2

(12) United States Patent
Colombo et al.

(10) Patent No.: US 7,093,631 B2
(45) Date of Patent: Aug. 22, 2006

(54) MULTIPURPOSE TIRE FOR A MOTOR VEHICLE

(75) Inventors: Gianfranco Colombo, Concorezzo (IT); Roberto Bolzoni, Giussago (IT)

(73) Assignee: Pirelli Pneumatici S.p.A., Milan (IT)

(*) Notice: Subject to any disclaimer, the term of this patent is extended or adjusted under 35 U.S.C. 154(b) by 312 days.

(21) Appl. No.: 10/148,449

(22) PCT Filed: Nov. 29, 2000

(86) PCT No.: PCT/EP00/12311

§ 371 (c)(1),
(2), (4) Date: Oct. 15, 2002

(87) PCT Pub. No.: WO01/39996

PCT Pub. Date: Jun. 7, 2001

(65) Prior Publication Data

US 2003/0094226 A1   May 22, 2003

Related U.S. Application Data

(60) Provisional application No. 60/186,275, filed on Mar. 1, 2000.

(30) Foreign Application Priority Data

Nov. 30, 1999 (EP) .................................. 99830745

(51) Int. Cl.
*B60C 11/03* (2006.01)
*B60C 11/12* (2006.01)

(52) U.S. Cl. ............................... 152/209.8; 152/209.9; 152/209.18; 152/903; 152/DIG. 3

(58) Field of Classification Search ............ 152/209.2, 152/209.8, 209.9, 209.18, 209.28, 902, 903, 152/DIG. 3; D12/599–603

See application file for complete search history.

(56) References Cited

U.S. PATENT DOCUMENTS 4,078,596 A * 3/1978 Nakayama et al. ..... 152/DIG. 3
5,291,929 A * 3/1994 Daisho et al. ......... 152/209.28

(Continued)

FOREIGN PATENT DOCUMENTS

EP             485884      *  5/1992

(Continued)

OTHER PUBLICATIONS

Kazuaki, Shinohara, "Pneumatic Tire", Patent Abstracts of Japan, JP 05301508, Nov. 16, 1993.

(Continued)

*Primary Examiner*—Steven D. Maki
(74) *Attorney, Agent, or Firm*—Finnegan, Henderson, Farabow, Garrett & Dunner, L.L.P.

(57) ABSTRACT

The tread of a multipurpose tire includes a central region and first and second shoulder regions. Circumferential grooves separate the central and shoulder regions. The central region includes first and second rows of blocks. The first and second rows are arranged between an equatorial plane of the tire and either of the circumferential grooves. The first row is separated from the second row by first and second grooves extending in first and second oblique directions relative to the equatorial plane. The first oblique direction is substantially perpendicular to the second oblique direction. Each first groove is connected to two second grooves at essentially T-shaped junctions. At least two blocks of the first row are separated from each other by a third groove substantially parallel to the second oblique direction. The third groove is connected to a first groove at an end of the first groove nearest the equatorial plane.

42 Claims, 13 Drawing Sheets

U.S. PATENT DOCUMENTS

| | | | | |
|---|---|---|---|---|
| 5,407,005 A | * | 4/1995 | Consolacion et al. | 152/209.9 |
| 5,580,404 A | * | 12/1996 | Hitzky | 152/DIG. 3 |
| 5,766,383 A | * | 6/1998 | Hasegawa et al. | 152/209.18 |
| 5,785,780 A | * | 7/1998 | Ochi | 152/DIG. 3 |
| 5,873,399 A | * | 2/1999 | Ochi et al. | 152/209.18 |
| D458,587 S | * | 6/2002 | Shimizu et al. | D12/603 |

FOREIGN PATENT DOCUMENTS

| | | |
|---|---|---|
| EP | 0 513 676 A1 | 11/1992 |
| EP | 0 826 523 A1 | 3/1998 |
| EP | 0 875 403 A2 | 11/1998 |
| JP | 64-36505 * | 2/1989 |
| JP | 6-48117 * | 2/1994 |
| JP | 6-48119 * | 2/1994 |
| JP | 6-305307 * | 11/1994 |

OTHER PUBLICATIONS

Toru, Tsuda, "Snow Tire For Vehicle", Patent Abstracts of Japan, JP 02128907, Jul. 17, 1990.

Kazuo, Hayashi, "High Performance Pneumatic Tire For Automobile", JP11245626, Sep. 14, 1999.

* cited by examiner

MULTIPURPOSE TIRE FOR A MOTOR VEHICLE

CROSS-REFERENCE TO RELATED APPLICATIONS

This application is a national stage entry under 35 U.S.C. § 371 from International Application No. PCT/EP00/12311, filed Nov. 29, 2000, in the European Patent Office, the contents of which are relied upon and incorporated herein by reference; additionally, Applicants claim the right of priority under 35 U.S.C. § 119(a)–(d) based on patent application No. 99830745.8, filed Nov. 30, 1999, in the European Patent Office; further, Applicants claim the benefit under 35 U.S.C. § 119(e) based on prior-filed, now abandoned provisional application No. 60/186,275, filed Mar. 1, 2000, in the U.S. Patent and Trademark Office.

BACKGROUND OF THE INVENTION

1. Field of the Invention

The present invention relates to a multipurpose tyre (all-season or all-road tyre) for a motor vehicle.

More specifically, the invention relates to the grooving of a multipurpose tyre, in as much as it is particularly suitable for motor car tyres designed to give good performance both on dry roads and on wet roads, and even on snow-covered roads.

2. Description of the Related Art

As is known, in tyres of multipurpose type the pattern and the compound of the tread band are designed so as to satisfy the various demands specifically required with reference to the type of behaviour which the tyre needs to display on various types of surface, i.e. not only on dry or wet surfaces but also on snow-covered surfaces, for which its use is envisaged.

These requirements are mainly conflicting, as a result of which the tyres which have been produced to date normally represent a compromise between these requirements, but do not in any case, however, reach the performance levels obtained with a tyre specifically designed for use on a given type of road surface, whether this is dry, wet or snow-covered.

Generally speaking, irrespective of the use for which it is designed, a good tyre should have, inter alia, good properties of directionality and tractional power, as well as good wear resistance.

The directionality properties, which consist of the ability of the tyre to accurately maintain the set trajectory, are positively influenced by the presence of longitudinal grooves, while the tractional power properties, which consist of the capacity of the tyre to transmit tangential forces both during acceleration and when braking, are enhanced by providing grooves aligned transversely to the direction of motion. The efficacy of these transverse grooves as regards the tractional power is proportionately better the more the alignment of the grooves approaches a direction parallel to the axis of rotation of the tyre, so that, normally, angles of between 45° and 90° relative to an equatorial plane of the tyre are chosen for these grooves.

That being said, it should be pointed out that as regards tyres specifically designed for driving on dry surfaces, the number and width of the longitudinal and transverse grooves tend to be reduced to improve the wear resistance, the noise level in motion and the smooth ride provided by the tyre.

However, as regards driving on a wet surface, a larger groove width is desired, especially as regards the circumferential grooves, which are responsible for discharging the water collected under the imprint area of the tyre in order to avoid the occurrence of the well-known and hazardous aquaplaning effect.

Finally, as regards driving on snow-covered surfaces, a large number of small notches or grooves is required in order to adequately trap the snow picked up off the road surface, the snow-on-snow friction being greater than the rubber-on-snow friction.

From the foregoing, it is quite easy to appreciate the difficulties encountered in producing a multipurpose tyre which simultaneously has to satisfy all these conflicting requirements, arising specifically with regard to driving on dry, wet and snow-covered surfaces.

Specifically, the use of wide circumferential grooves conflicts both with the requirements of driving on dry surfaces, which prefer small grooves in order to increase the solid portion of the tread pattern, so as to improve the wear resistance and the noise level in motion, and with the requirements of driving on snow-covered surfaces, with regard to which wide grooves, which aid the self-cleaning of the tread pattern, produce a limitation of the behavioral properties, particularly tractional power and road holding.

The many notches required for use on snow-covered surfaces also conflict with the requirements for driving on dry surfaces, in which an excessive number of notches entails greater deformability of the blocks, with an increase in the noise level, and with the wear, as well as a reduction in the driving stability and smoothness of ride.

Thus it follows that the current multipurpose tyres have quite good hold under wet conditions, although this is inferior to that of modern tyres specifically designed for driving on wet surfaces, quite good tractional power in snowy conditions, but inferior to that which can be achieved by tyres specifically designed for winter conditions, as well as acceptable wear resistance and a sufficient hold on dry roads, although not to the same level as the best summer tyres commercially available.

SUMMARY OF THE INVENTION

EP 0,826,523 discloses a vehicle tyre, especially for use in wintry driving conditions, including a tread strip profile divided into four circumferential rows of blocks, two central rows of blocks and two shoulder rows of blocks. The tread strip profile is divided into the four circumferential rows of blocks by three circumferential grooves. For a given shoulder row of blocks, the blocks are separated from each other by transverse grooves. All of the blocks are provide with a plurality of fine laminar incisions extending essentially parallel to each other and oriented substantially in a transverse direction of the tread strip profile.

For a given central row of blocks, the blocks are separated from each other by two types of transverse grooves. One of these two types of transverse grooves is a second portion of the transverse grooves separating the blocks of the adjacent shoulder row of blocks. The other type of transverse groove connects the central circumferential groove, a termination of one of the second portions of the transverse grooves separating the blocks of the adjacent shoulder row of blocks, and another of the second portions of the transverse grooves separating the blocks of the adjacent shoulder row of blocks.

This tyre is designed for use in wintry driving conditions. Accordingly, all of the blocks in each row are provided with a plurality of fine laminar incisions.

The aim of the present invention is to produce a tyre of road and off-road type which has excellent behaviour on snow-covered roads, as well as with respect to aquaplaning and good behaviour on dry roads.

A first object of the invention is a multipurpose tyre for a motor vehicle, said tyre having an equatorial plane and being provided with a tread which has a central region and a first and a second shoulder region, said central region being separated from said first and second shoulder regions by a first and a second circumferential groove, respectively, said central region comprising at least first and second blocks arranged between said equatorial plane and one of said first and second circumferential grooves, characterized in that said first and second blocks form a first and a second row and are separated from each other by first and second grooves which extend in an oblique direction relative to said equatorial plane, said first oblique grooves extending substantially perpendicularly relative to said second oblique grooves, each first oblique groove crossing two successive second oblique grooves and forming with each of them a respective junction which is essentially T-shaped.

The tyre according to the invention has optimized tractional power and braking on snow-covered roads since the central region of its tread has a plurality of crossed oblique grooves with T-shaped junctions, i.e. dead-end junctions, which trap the snow and enable snow-on-snow friction to be produced.

Preferably, said first oblique grooves have a width which decreases in the direction of said equatorial plane. In fact, it has been noted that this characteristic helps to trap the snow too.

Advantageously, said first and second blocks of said first and second rows are side by side and diverge obliquely.

Preferably, said first blocks have two portions which extend obliquely relative to each other, such that each block has an overall shape resembling that of the number 1.

In turn, said second blocks are essentially trapezoid-shaped.

Preferably, said central region also comprises third and fourth blocks located between said equatorial plane and the other of said first and second circumferential grooves, said third and fourth blocks forming a third and a fourth row and being separated from each other by third and fourth grooves which extend in an oblique direction relative to said equatorial plane, said third oblique grooves extending substantially perpendicularly relative to said fourth oblique grooves, each third oblique groove crossing two successive fourth oblique grooves and forming with each of them a respective junction which is essentially T-shaped.

Advantageously, said third oblique grooves have a width which decreases in the direction of said equatorial plane.

Preferably, said third and fourth blocks of said third and fourth rows are side by side and diverge obliquely, said third and fourth side-by-side blocks being inclined in the opposite direction to said first and second side-by-side blocks.

Advantageously, said third blocks have two portions which extend obliquely relative to each other, such that each block has an overall shape resembling that of the number 1.

In turn, said fourth blocks are essentially trapezoid-shaped.

Preferably, at least two of said first blocks are also separated from each other by a fifth oblique groove, which is substantially parallel to said second oblique grooves, said fifth oblique groove joining up with one of said first oblique grooves at that end of the latter which is nearest said equatorial plane, by means of an elbow join.

Furthermore, at least two of said first blocks are also separated from each other by a first oblique sipe which is substantially parallel to said second oblique grooves, said first oblique sipe joining up with one of said first oblique grooves at that end of the latter which is nearest said equatorial plane.

Advantageously, at least two of said third blocks are also separated from each other by a sixth oblique groove which is substantially parallel to said fourth oblique grooves, said sixth oblique groove joining up with one of said third oblique grooves at that end of the latter which is nearest said equatorial plane, by means of an elbow join.

Furthermore, at least two of said third blocks are also separated from each other by a second oblique sipe, which is substantially parallel to said fourth oblique grooves, said second oblique sipe joining up with one of said third oblique grooves at that end of the latter which is nearest said equatorial plane.

Preferably, said central region also comprises a circumferential rib and a third and a fourth circumferential groove.

Advantageously, said third circumferential groove separates said circumferential rib from said row of first blocks and is in communication with said first circumferential groove via first transverse zig-zag paths comprising said fifth oblique grooves and said first and second oblique grooves.

In turn, said fourth circumferential groove separates said circumferential rib from said row of third blocks and is in communication with said second circumferential groove via second transverse zig-zag paths comprising said sixth oblique grooves and said third and fourth oblique grooves.

Advantageously, said first circumferential groove is wider than said second circumferential groove.

In turn, said second oblique grooves are wider than said fourth oblique grooves.

Moreover, said third and fourth circumferential grooves are wider than said first circumferential groove.

According to one embodiment, said first and second blocks have areas that are substantially equal to the areas of said third and said fourth blocks, respectively.

According to a further embodiment, said first and second blocks have areas that are substantially less than the areas of said third and said fourth blocks, respectively.

According to one embodiment, said circumferential rib has a mid-plane which is coincident with said equatorial plane.

According to a further embodiment, said circumferential rib has a mid-plane which is eccentric with respect to said equatorial plane.

Preferably, each of said first blocks has a pair of substantially oblique third sipes which are substantially parallel to said second oblique grooves, and a fourth sipe which is essentially hook-shaped with sides that are substantially parallel to said first and said second oblique grooves.

In turn, each of said second blocks has three substantially oblique fifth sipes which are substantially parallel to said second oblique grooves.

In addition, each of said third blocks is free of sipes.

Advantageously, each of said fourth blocks has a sixth sipe which is substantially trapezoid-shaped, similar to the shape of the respective fourth block which is substantially trapezoid-shaped and smaller in size than this block.

According to one embodiment, each of said third blocks has three substantially oblique seventh sipes which are substantially parallel to said fourth oblique grooves.

In turn, each of said fourth blocks has a pair of substantially oblique eighth sipes which are substantially parallel to said fourth oblique grooves.

Advantageously, each of said first blocks has a ninth oblique sipe which is substantially parallel to said second oblique grooves, and a tenth sipe which is substantially S-shaped.

In turn, each of said second blocks has an eleventh central sipe which is substantially S-shaped, and two substantially oblique twelfth sipes which are substantially parallel to said second oblique grooves and located on either side of said S-shaped eleventh sipe.

Preferably, each of said third blocks has two substantially oblique thirteenth sipes which are substantially parallel to said fourth oblique grooves, and a fourteenth sipe which is substantially S-shaped.

Furthermore, each of said fourth blocks has a central fifteenth sipe which is substantially S-shaped, and two substantially oblique sixteenth sipes which are substantially parallel to said fourth oblique grooves and located on either side of said S-shaped fifteenth sipe.

Advantageously, said circumferential rib has seventeenth and eighteenth substantially oblique sipes which are, substantially parallel to said second and fourth oblique grooves.

Preferably, said first shoulder region comprises fifth shoulder blocks separated by seventh grooves which are substantially transverse relative to said equatorial plane and which communicate with said first circumferential groove, and said second shoulder region comprises sixth shoulder blocks separated by eighth grooves that are substantially transverse relative to said equatorial plane and which communicate with said second circumferential groove.

Advantageously, each seventh substantially transverse groove has a connecting portion provided with an opening which is substantially eccentric relative to each second oblique groove.

In turn, each substantially transverse eighth groove has a connecting portion provided with an opening which is substantially concentric with a fourth oblique groove.

According to a further embodiment, each substantially transverse seventh groove is wider than each substantially transverse eighth groove.

Preferably, each of said fifth shoulder blocks has three nineteenth sipes which are substantially transverse relative to said equatorial plane.

In turn, each of said sixth shoulder blocks has a twentieth sipe which is substantially transverse relative to said equatorial plane.

According to an embodiment, each of said sixth shoulder blocks has three twenty-first sipes which are substantially transverse relative to said equatorial plane.

According to a further embodiment, each of said fifth shoulder blocks has two twenty-second substantially transverse sipes, each of which crosses a substantially circumferential twenty-third sipe.

In turn, each of said sixth shoulder blocks has a central twenty-fourth sipe which is substantially S-shaped and two substantially transverse twenty-fifth sipes located on either side of said S-shaped twenty-fourth sipe.

A second object of the invention is a multipurpose tyre for a motor vehicle, said tyre having an equatorial plane and being provided with a tread having a central region and a first and a second shoulder region, said central region being separated from said first and second shoulder regions by a first and a second circumferential groove, respectively, said central region comprising at least first and second blocks located between said equatorial plane and one of said first and second circumferential grooves, characterized in that said first and second blocks form a first and a second row and are separated from each other by first and second grooves which extend in an oblique direction relative to said equatorial plane, said first oblique grooves extending essentially perpendicularly relative to said second oblique grooves, said first oblique grooves having a width which decreases in the direction of said equatorial plane.

Preferably, said central region also comprises third and fourth blocks located between said equatorial plane and the other of said first and second circumferential grooves, said third and fourth blocks forming a third and a fourth row and being separated from each other by third and fourth grooves which extend in an oblique direction relative to said equatorial plane, said third oblique grooves extending essentially perpendicularly relative to said fourth oblique grooves, said third oblique grooves having a width which decreases in the direction of said equatorial plane.

In the tyre according to the invention, the blocks in the central region and in the shoulder regions have a plurality of sipes which contribute towards trapping snow.

The tyre also has optimized behaviour with respect to aquaplaning. Contribution towards this is made by the presence, in the inner zone of the tread, of circumferential and transverse shoulder grooves which are wider than the analogous circumferential and transverse grooves in the outer zone of the tread.

Furthermore, the tyre has good behaviour in terms of tractional power, braking and cornering on dry roads.

In the course of the present description and in the claims, the term "rib" means a bead of a tyre tread band which is continuously delimited on two of its sides, and the term "sipe" means a notch not wider than 1 mm.

BRIEF DESCRIPTION OF THE DRAWINGS

Further characteristics and advantages of the invention will now be illustrated with reference to embodiments shown by way of non-limiting example in the attached figures, in which.

DETAILED DESCRIPTION OF THE PREFERRED EMBODIMENTS

Figure 1:
FIG. 1 is a perspective view of a multipurpose tyre made according to the invention.
Figure 3:
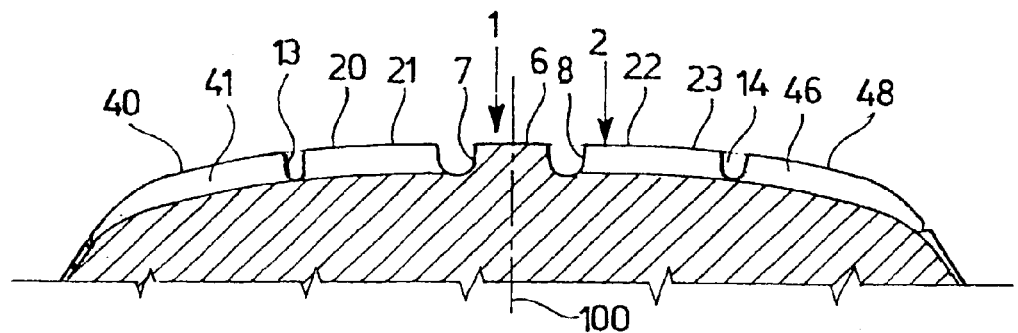
FIG. 3 is a view in cross section on the plane marked III—III in FIG. 2.
Figure 2:
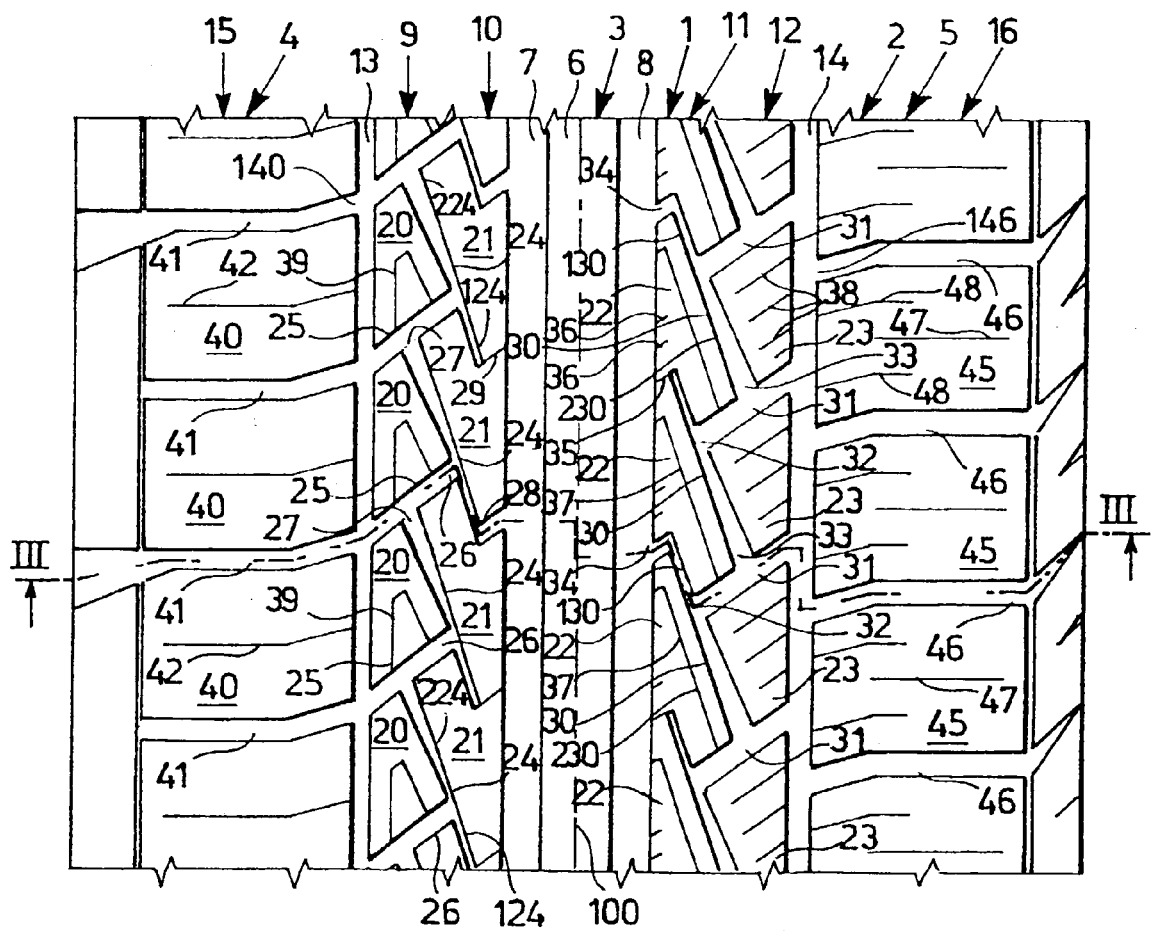
FIG. 2 is a partial plan view of a tread of the tyre of FIG. 1.

FIGS. 1, 2 and 3 show a multipurpose tyre 1 for a motor vehicle, with a tread 2 of a selected compound. Tread 2 is of the asymmetric type, i.e. it works more efficiently when the tyre is mounted on the vehicle with a given orientation rather than with the opposite orientation. In other words, the tyre preferably has an inner side wall (vehicle side) and an outer side wall. Tyre 1 has an equatorial plane 100.

Tread 2 has a central region 3 and two shoulder regions 4 and 5, left and right. Central region 3 comprises a circumferential rib 6, two deep circumferential grooves 7 and 8, and circumferential rows of blocks 9, 10, 11 and 12. Rib 6 has a longitudinal mid-plane which is coincident with equatorial plane 100. Central region 3 is divided from shoulder region 4 by a deep circumferential side groove 13 and from shoulder region 5 by a deep circumferential side groove 14. Shoulder region 4 comprises a circumferential row of shoulder blocks 15 and shoulder region 5 comprises a circumferential row of shoulder blocks 16.

The circumferential rows of blocks 9 and 10 are located to the left of equatorial plane 100 and the circumferential rows of blocks 11 and 12 are located to the right of the equatorial plane. The row of blocks 9 comprises blocks 20 which are substantially trapezoid-shaped (scalene trapezium) and the row of blocks 10 comprises blocks 21 having two portions which extend obliquely relative to each other such that each block has an overall shape resembling that of the number 1. In turn, the row of blocks 11 comprises blocks 22 having two portions which extend obliquely relative to each other such that each block has an overall shape resembling that of the number 1 and the row of blocks 12 comprises blocks 23 which are substantially trapezoid-shaped (scalene trapezium). Blocks 20 and 21 of rows 9 and 10 which are side by side and blocks 22 and 23 of rows 11 and 12 which are side by side, diverge obliquely with an arrangement of the herringbone type. Side-by-side blocks 20 and 21 of rows 9 and 10 have opposite inclinations to those of side-by-side blocks 22 and 23 of rows 11 and 12.

Blocks 20 and 21 of rows 9 and 10 are separated by grooves 24 and 25 which extend in an oblique (diagonal) direction relative to equatorial plane 100. Each oblique groove 24 has a rectilinear axis inclined at about 20° relative to the equatorial plane. Each oblique groove 25 also has a rectilinear axis. The axes of oblique grooves 24 and 25 are substantially perpendicular to each other and form an angle of about 105°, which varies by about ±10°. Each oblique groove 24 crosses two successive oblique grooves 25 and forms with the first a T-shaped junction 26 and with the second a T-shaped junction 27, i.e. two dead-end junctions.

Oblique grooves 24 have a portion 124 of restricted width and a portion 224 whose width increases in the direction of circumferential side groove 13. These have a substantially divergent shape.

Pairs of blocks 21 are also separated by narrow oblique grooves 28, or by oblique sipes 29, substantially parallel to oblique grooves 25. Oblique grooves 28 and oblique sipes 29 are in communication with circumferential groove 7 and alternate in the circumferential development of the tyre. Each oblique groove 28 joins up with that end of a respective oblique groove 24 which is nearest equatorial plane 100, by means of an elbow join. In turn, each oblique sipe 29 joins up with that end of a respective oblique groove 24 which is nearest equatorial plane 100.

Each trapezoid-shaped block 20 has a sipe 39 which is essentially trapezoid-shaped. Each trapezoid-shaped sipe 39 has a similar shape to that of respective trapezoid-shaped block 20 and is smaller in size than this block.

Blocks 21 are free of sipes.

Blocks 22 and 23 of rows 11 and 12 are separated by grooves 30 and 31 which extend in an oblique direction relative to equatorial plane 100. Each oblique groove 30 has a rectilinear axis inclined at an angle of about 20° relative to the equatorial plane. Each oblique groove 31 also has a rectilinear axis. The axes of oblique grooves 30 and 31 are essentially perpendicular and form an angle of about 105°±10°. Each oblique groove 30 crosses two successive oblique grooves 31 and forms a T-shaped junction 32 with the first and a T-shaped junction 33 with the second, i.e. two dead-end junctions.

Oblique grooves 30 have a narrow portion 130 and a portion 230 whose width increases in the direction of circumferential side groove 14. These portions have a substantially divergent shape.

Pairs of blocks 22 are also separated by narrow oblique grooves 34, or by oblique sipes 35, which are substantially parallel to oblique grooves 31. Grooves 34 and sipes 35 are in communication with circumferential groove 8 and alternate in the circumferential development of the tyre. Each oblique groove 34 joins up with that end of a respective oblique groove 30 which is nearest equatorial plane 100, by means of an elbow join. In turn, each oblique sipe 35 joins up with that end of a respective oblique groove 30 which is nearest equatorial plane 100, Each block 22 has two oblique sipes 36, which are substantially parallel to oblique grooves 31, and a sipe 37 which is essentially hook-shaped with sides which are substantially parallel to oblique grooves 30 and 31.

Each trapezoid-shaped block 23 has three oblique sipes 38, which are substantially parallel to oblique grooves 31.

Blocks 20 are equal in area to blocks 23 and blocks 21 are equal in area to blocks 22.

Preferably, the rows of blocks 22 and 23 are located in the inner zone of the tread (vehicle side), when the tyre is mounted on the motor vehicle.

Each block 22 of row 11 is obtained by rotating a block 21 of row 10 by 180° around an axis lying in the plane of the sheet and passing through equatorial plane 100. The block thus obtained is then turned over by 180° relative to an axis lying in the plane of the sheet and perpendicular to equatorial plane 100. In turn, each block 23 of row 12 is obtained in the same way from a block 20 of row 9.

The row of shoulder blocks 15 comprises shoulder blocks 40, each of which is formed from a portion which is substantially rectangular-shaped and from a portion which is substantially parallelogram-shaped. Blocks 40 are separated from each other by grooves 41 communicating with circumferential side groove 13. Each transverse groove 41 is formed from a portion which is essentially transverse relative to equatorial plane 100 and from an oblique connecting portion. The two portions are continuous and each oblique portion has an opening 140 which is essentially concentric with one of oblique grooves 25 of the rows of blocks 9 and 10. Each block 40 has a sipe 42 formed from an essentially transverse portion and from an oblique portion.

The row of shoulder blocks 16 comprises shoulder blocks 45, each of which is formed from a portion which is essentially rectangular-shaped and from a portion which is essentially parallelogram-shaped. Blocks 45 are separated from each other by grooves 46 communicating with circumferential side groove 14. Each transverse groove 46 is formed from a portion which is essentially transverse relative to equatorial plane 100 and from an oblique connecting portion. The two portions are continuous and each oblique portion has an opening 146 which is essentially eccentric relative to oblique grooves 31 of the rows of blocks 11 and 12. Each block 45 has an essentially transverse sipe 47, and two sipes 48 located on either side of sipe 47. Sipes 48 are formed from an oblique portion and from an essentially transverse portion.

In tyre 1, groove 7 is in communication with groove 13 via tortuous zig-zag transverse paths comprising oblique grooves 28, 24 and 25. In turn, groove 8 is in communication with groove 14 via tortuous zig-zag transverse paths comprising oblique grooves 34, 30 and 31.

Circumferential groove 14 is wider than circumferential groove 13 and circumferential grooves 7 and 8 are wider than groove 14. For example, groove 13 has a width of between 3 mm and 5.5 mm; groove 14 has a width of between 4 mm and 7 mm and grooves 7 and 8 have a width of between 9 mm and 11 mm.

Oblique grooves 31 are wider than grooves 24. For example, oblique grooves 24 have widths of between 4 mm and 6 mm and oblique grooves 31 have widths of between 4.5 mm and 6.5 mm.

Transverse grooves 46 are wider than transverse grooves 41. For example, grooves 41 have a width of between 5 mm and 6.5 mm and grooves 46 have a width of between 5.5 mm and 7 mm.

Grooves 7, 8, 13 and 14 have a depth of between 7 mm and 9.5 mm.

Figure 4:
FIG. 4 is a view in perspective of an embodiment of the tyre of FIG. 1.
Figure 6:
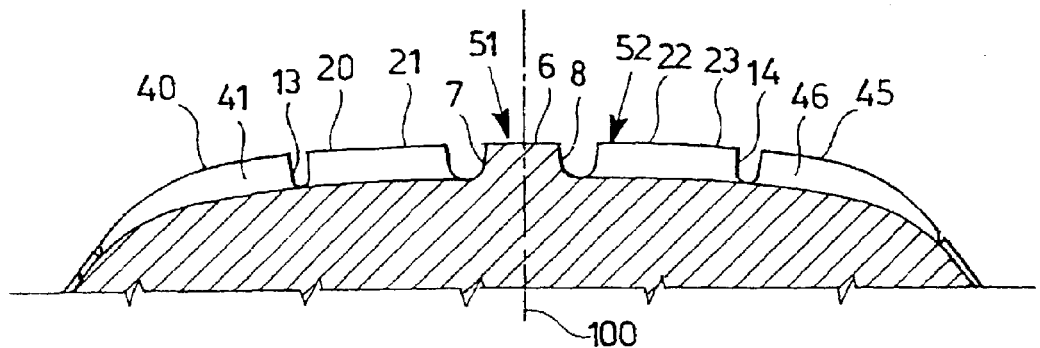
FIG. 6 is a view in cross section on the plane marked VI—VI in FIG. 5.
Figure 5:
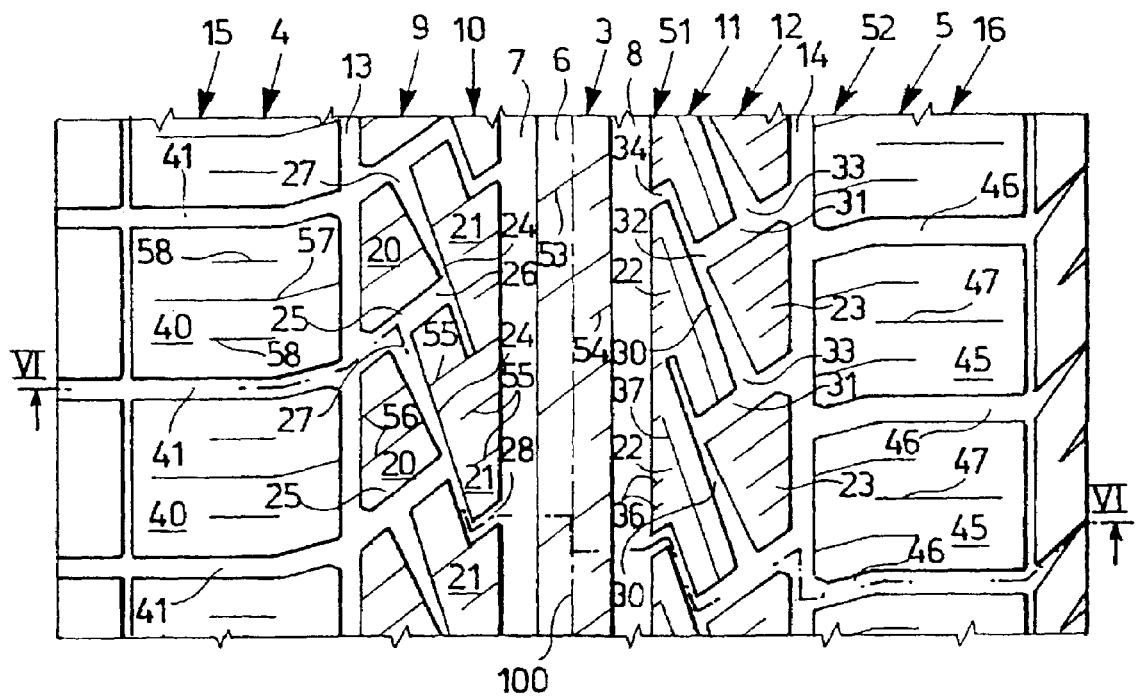
FIG. 5 is a partial plan view of a tread of the tyre of FIG. 4.

FIGS. 4, 5 and 6 show a multipurpose tyre 51 of asymmetric type which constitutes a variant of tyre 1, and in which parts identical to those of tyre 1 are indicated by the same numerals. Tyre 51 has a tread 52 in which circumferential rib 6 has oblique sipes 53 and 54. Each block 21 has three oblique sipes 55. Each trapezoid-shaped block 20 has two oblique sipes 56 and a chamfered edge. Each trapezoid-shaped block 23 also has a chamfered edge.

Preferably, the rows of blocks 22 and 23 are located in the inner zone of the tread (vehicle side), when the tyre is mounted on the motor vehicle.

Each shoulder block 40 has a sipe 57 formed from a transverse portion and from an oblique portion, and two transverse sipes 58 located on either side of sipe 57. Each shoulder block 40 and 45 has a chamfered edge.

Figure 8:
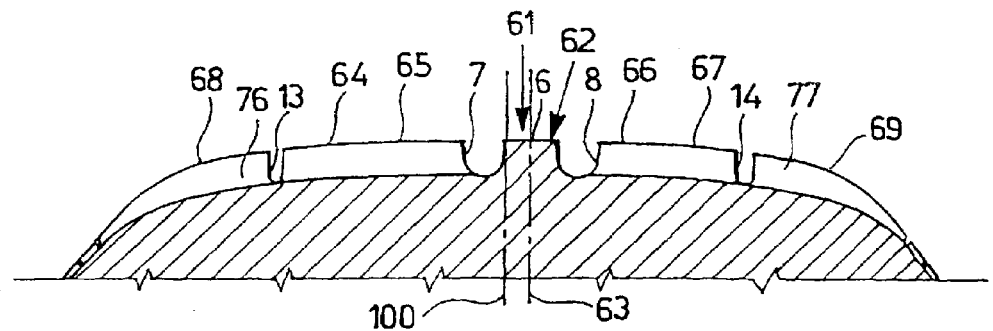
FIG. 8 is a view in cross section on the plane marked VIII—VIII in FIG. 7.
Figure 7:
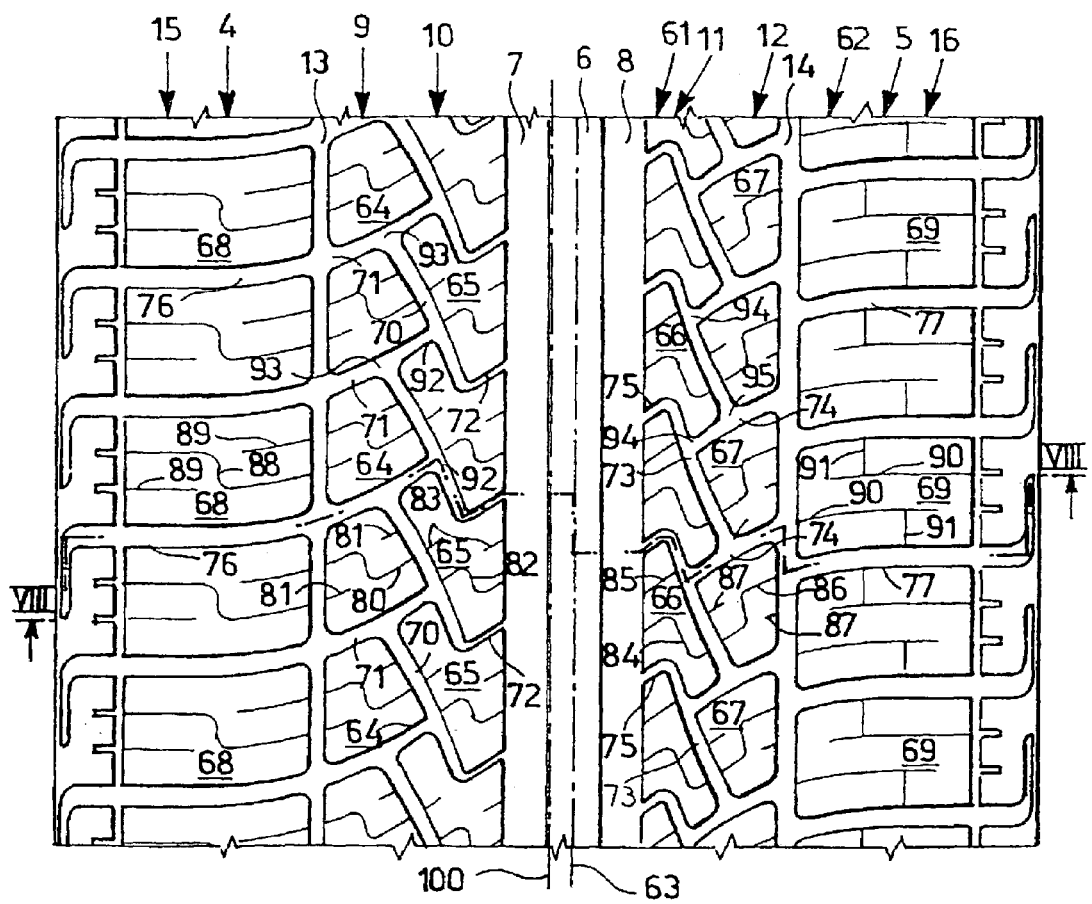
FIG. 7 is a partial plan view of a tread of a further embodiment of the tyre of FIG. 1.

FIGS. 7 and 8 show a multipurpose tyre 61 which constitutes a further variant of tyre 1, and parts which are identical are indicated by the same numerals. Tyre 61 has a tread 62 of asymmetric type. In tread 62, circumferential rib 6 has a mid-plane 63 which is eccentric relative to equatorial plane 100.

The rows of blocks 9 and 12 comprise blocks 64 and 67, respectively, which are essentially trapezoid-shaped (scalene trapezium) with three curved sides and three rounded edges. The rows of blocks 10 and 11 comprise blocks 65 and 66, respectively, with two portions which extend obliquely relative to each other, such that each block has an overall shape resembling that of the number 1, with three curved sides and four rounded edges. The rows of shoulder blocks 15 and 16 comprise shoulder blocks 68 and 69, respectively, which are essentially parallelogram-shaped with two curved sides and two rounded edges.

Blocks 64 and 65 of rows 9 and 10 are separated by curved oblique grooves 70 and 71. Each groove 70 has an axis inclined at an angle of about 20° relative to the equatorial plane. The axes of grooves 70 and 71 are essentially orthogonal and form an angle of about 105°±10°. Each oblique groove 70 crosses two successive oblique grooves 71 and forms a T-shaped junction 92 with the first and a T-shaped junction 93 with the second. Oblique grooves 70 have a width which increases in the direction of circumferential side groove 13 and are of essentially divergent shape. Oblique grooves 72 are in communication with circumferential groove 7. Blocks 65 are also separated by narrow oblique grooves 72 which are substantially parallel to grooves 71 and are in communication with circumferential groove 7. Each oblique groove 72 joins up with that end of oblique groove 70 which is nearest equatorial plane 100, by means of an elbow join. Each trapezoid-shaped block 64 has an S-shaped sipe 80 and two oblique sipes 81 located on either side of sipe 80. Each block 65 has an S-shaped sipe. 82 and two oblique sipes 83.

Blocks 66 and 67 of rows 11 and 12 are separated by curved oblique grooves 73 and 74. Each groove 73 has an axis inclined at an angle of about 20° relative to the equatorial plane. The axes of grooves 73 and 74 are essentially orthogonal and form an angle of about 105°±10°. Each oblique groove 73 crosses two successive oblique grooves 74 and forms a T-shaped junction 94 with the first and a T-shaped junction 95 with the second. Oblique grooves 73 have a width which increases in the direction of circumferential side groove 14 and are of essentially divergent shape. Blocks 66 are also separated by narrow oblique grooves 75 which are substantially parallel to grooves 74 and are in communication with circumferential groove 8. Each oblique groove 75 joins up with that end of oblique groove 73 which is nearest equatorial plane 100, by means of an elbow join. Each block 66 has an S-shaped sipe 84 and an oblique sipe 85. Each trapezoid-shaped block 67 has an S-shaped sipe 86 and two oblique sipes 87 located on either side of sipe 86.

Blocks 64 have a greater area than blocks 67 and blocks 65 have a greater area than blocks 66.

Preferably, the rows of blocks 66 and 67 are located in the inner zone of the tread (vehicle side), when the tyre is mounted on the motor vehicle.

Shoulder blocks 68 and 69 of rows 15 and 16 are separated by curved transverse grooves 76 and 77, respectively. Each block 68 has an S-shaped sipe 88 and two essentially transverse sipes 89 located on either side of sipe 88. Each block 69 has essentially transverse sipes 90 which cross respective essentially longitudinal sipes 91 in communication with the transverse grooves 77.

Figure 9:
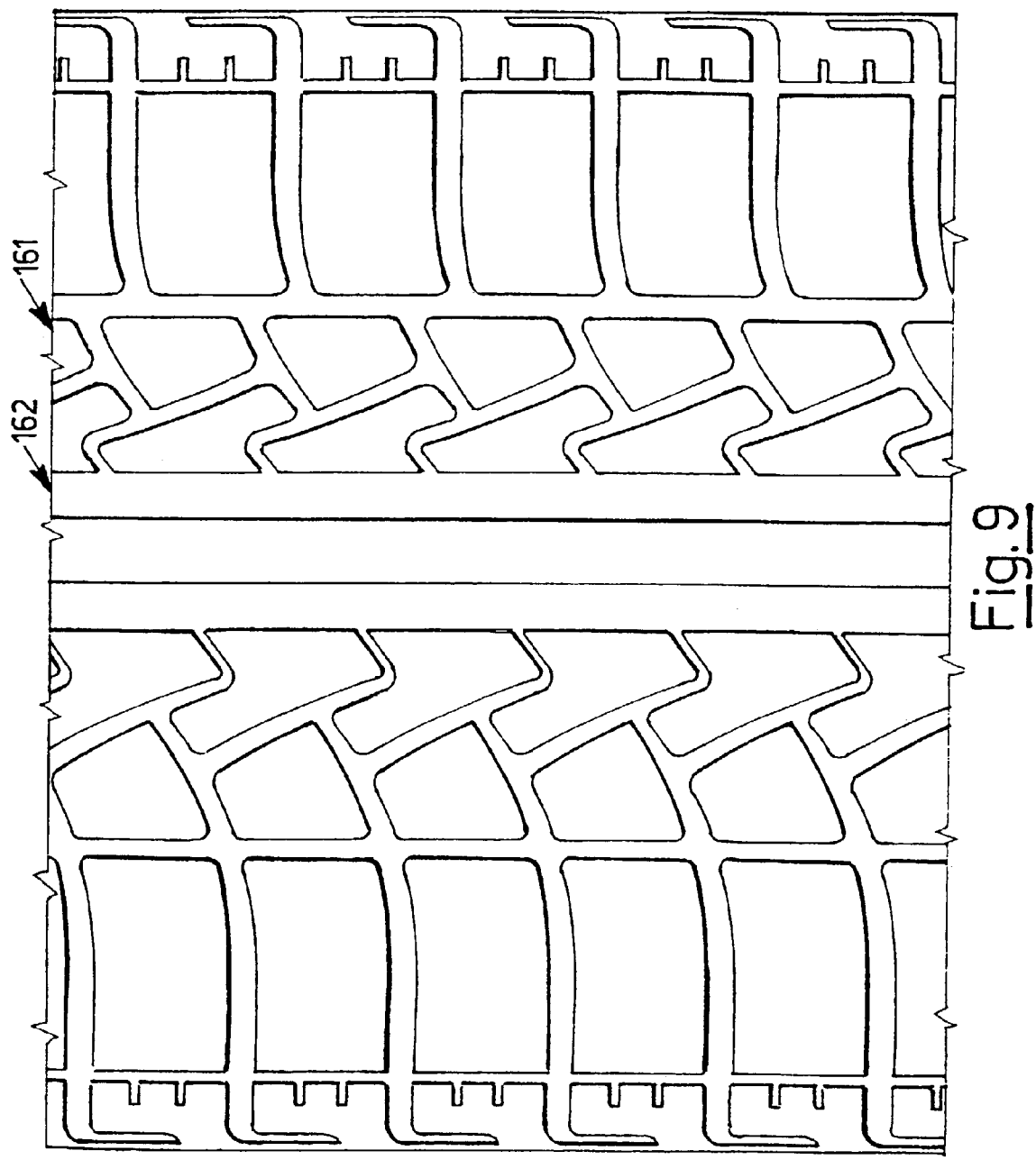
FIGS. 9, 10 and 11 are partial plan views of embodiments of the tread of the tyre of FIGS. 7 and 8.

FIG. 9 shows a tread 162 of a tyre 161 which constitutes a variant of tyre 61 of FIGS. 7 and 8. Tread 162 has the same pattern as tread 62, whereas its blocks are free of sipes.

Figure 10:
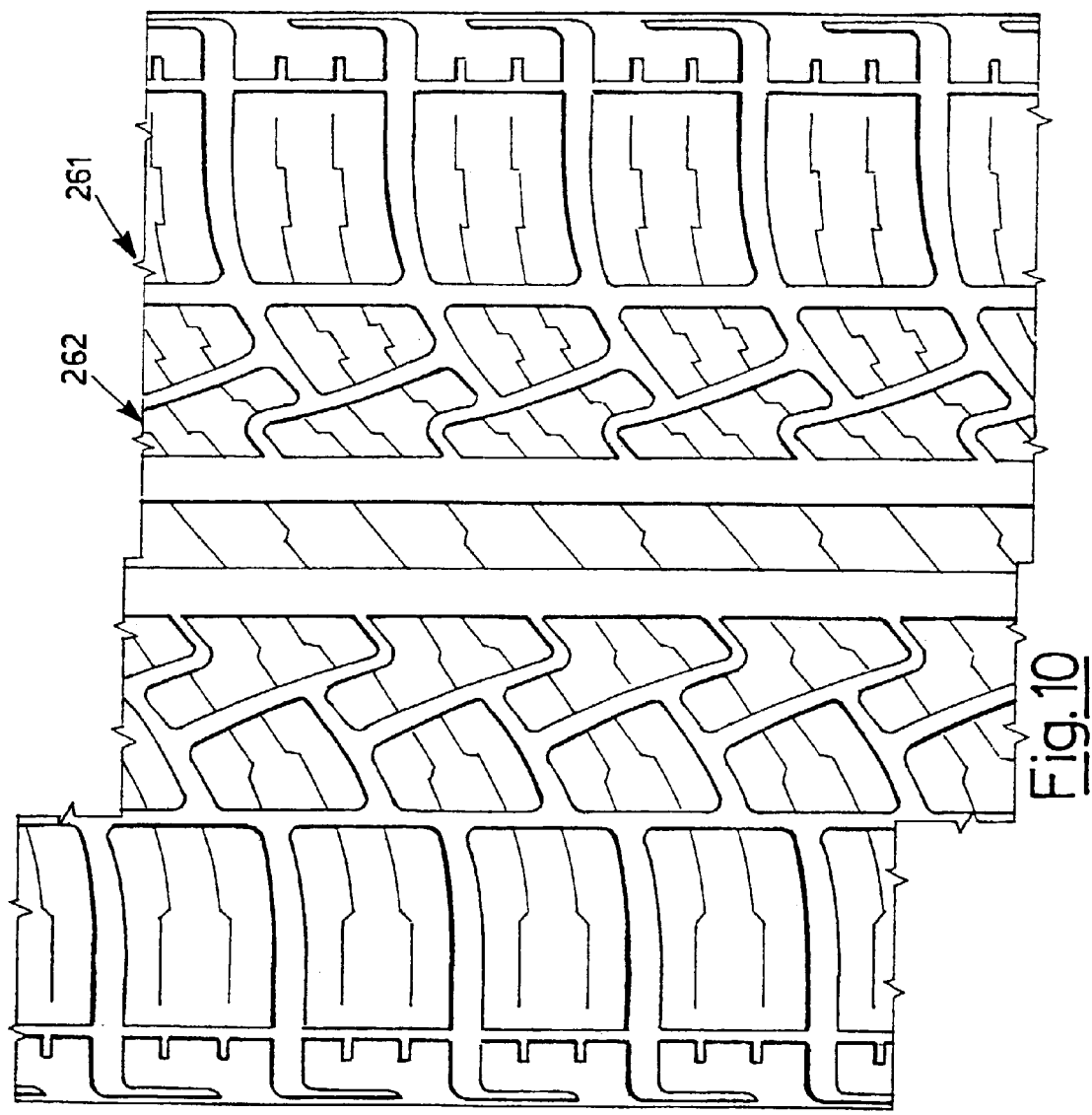
Figure 11:
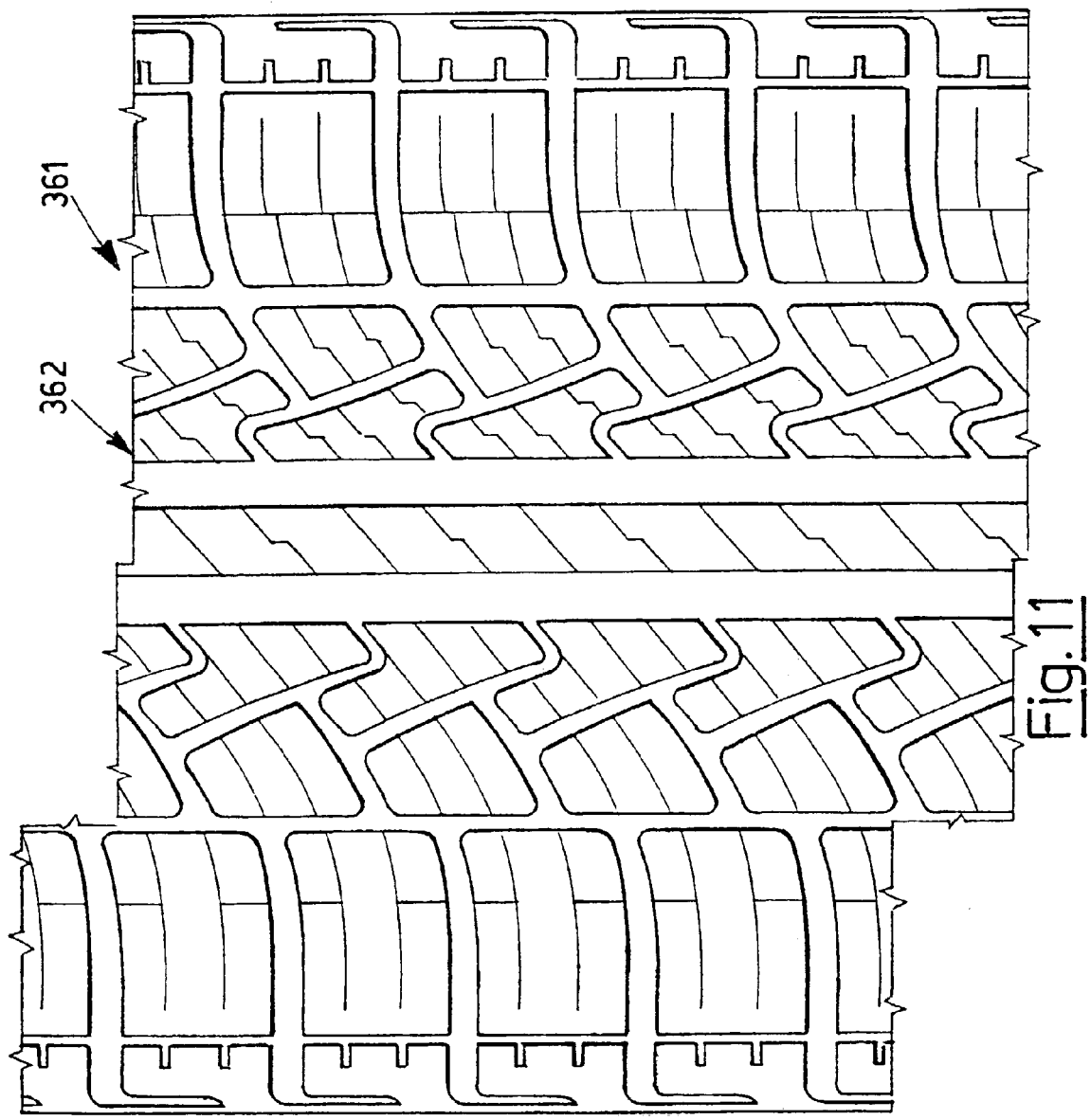
Figure 12:
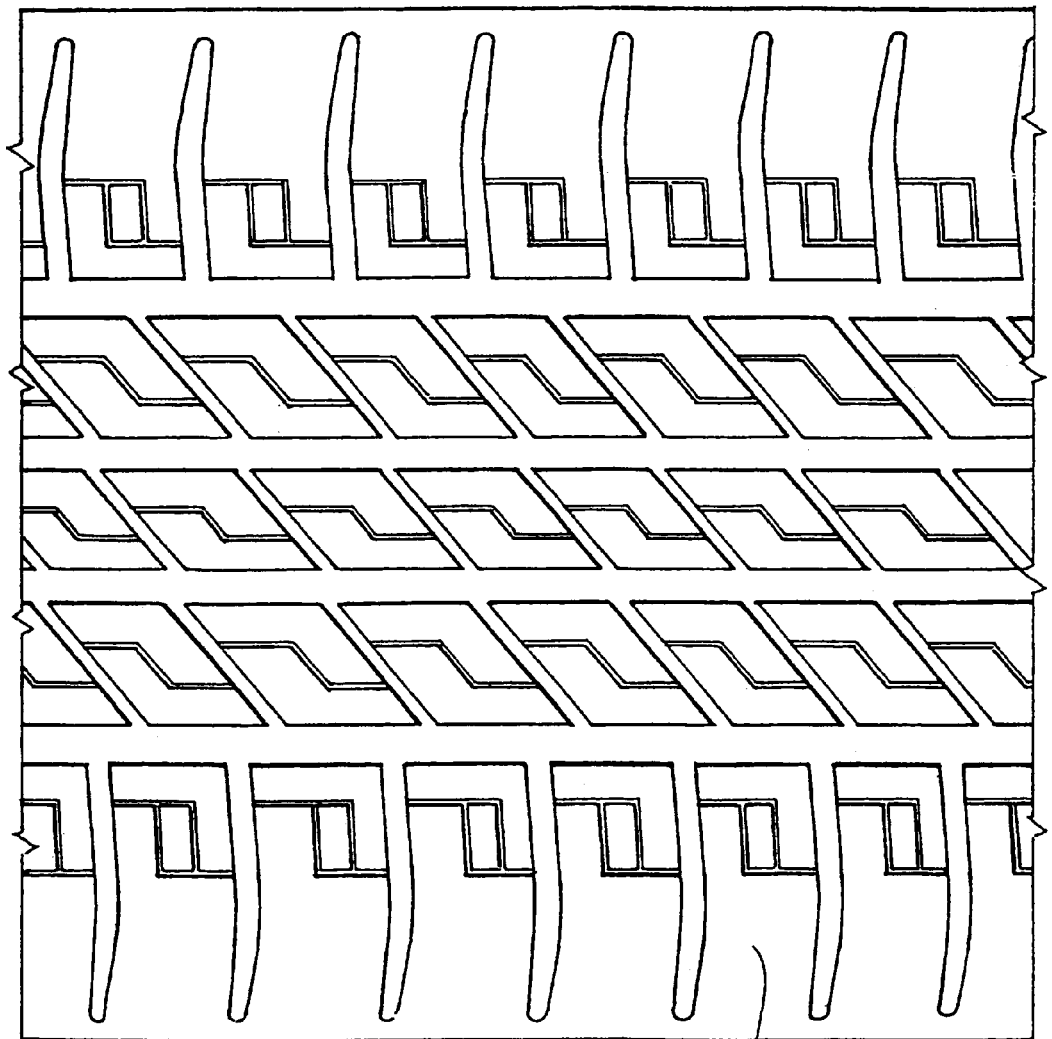
FIGS. 12–16 show treads for conventional tyres (X, Y, Z, V, W).
Figure 13:
Figure 14:
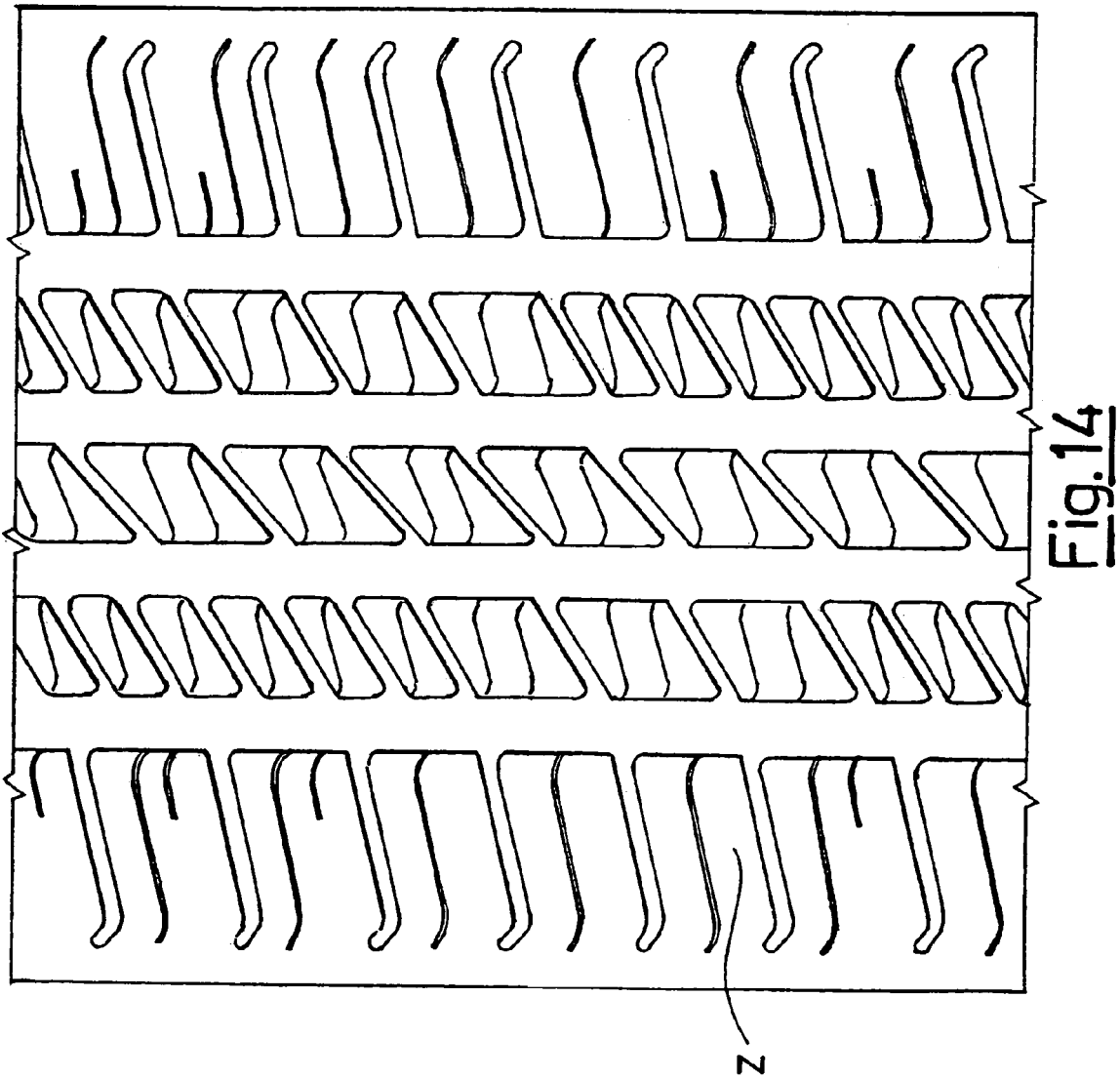
Figure 15:
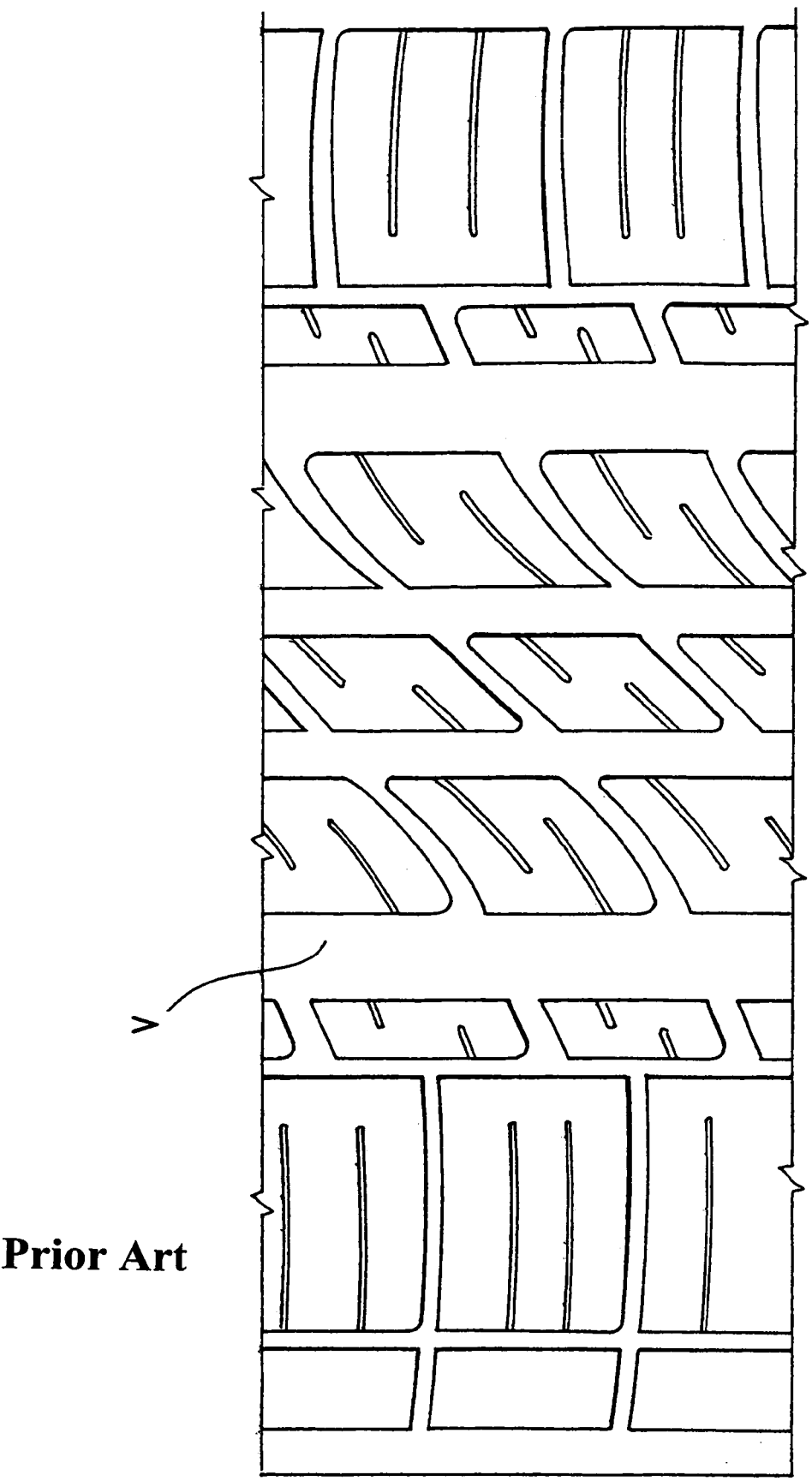
Figure 16:
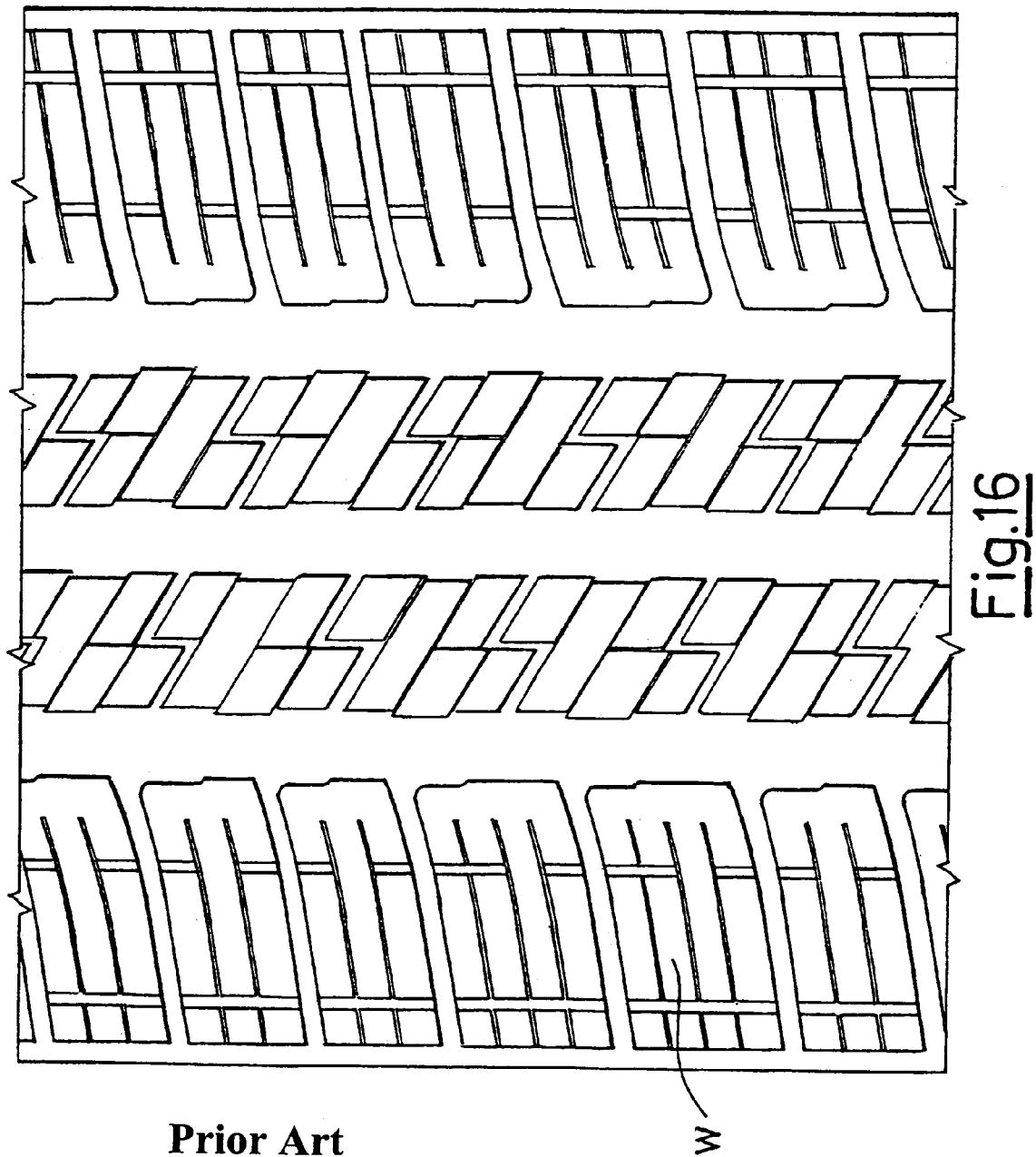

FIGS. 10 and 11 show a tread 262 of a tyre 261 and a tread 362 of a tyre 361 which constitute other variants of tyre 61 of FIGS. 7 and 8. Treads 262 and 362 have the same pattern as tread 62, whereas the sipes in their blocks have a different shape.

The structure of tyres 1, 51, 61, 161, 261 and 361 is per se of traditional type and comprises a carcass, a tread band encircling said carcass, and a pair of axially opposite side walls ending in beads reinforced with bead wires and associated bead fillings, for fixing said tyre to a corresponding mounting rim. The tyre preferably also comprises a belt structure interposed between the carcass and the tread band.

The carcass is reinforced with one or more carcass plies fixed to said bead wires, while the belt structure comprises two belt strips formed from sections of rubberized fabric comprising metal cords which are parallel to each other in each strip and crossed at an angle to those of adjacent strips, preferably inclined symmetrically relative to the equatorial plane and radially superimposed on each other. Preferably, a third belt strip is also present, in a radially more external position, provided with cords, preferably textile cords and even more preferably cords made of a heat-shrinkable material, oriented circumferentially, i.e. at 0° relative to said equatorial plane.

Preferably, the tyre is of the type with a very low cross section, for example between 0.65 and 0.30, where these values indicate the percentage value of the ratio between the height of the right section of the tyre and the maximum chord of said section. This ratio is usually known in the art as H/C.

Examples of tyres 1, 51, 61, 161, 261 and 361 were prepared and it was demonstrated that they had excellent values in terms of tractional power and braking on snow-covered roads and in terms of behaviour with respect to aquaplaning, and good handling in wet and dry conditions, by means of comparative tests against conventional tyres, carried out on roads and on tracks.

The tyres of the invention were compared with commercially available tyres of winter, summer and multipurpose types. The tread of the comparative tyres had the patterns X, Y, Z, V and W represented respectively in FIGS. 12, 13, 14, 15 and 16. The first tyre (tread X) is of the summer type, the second (tread Y) is of the winter type, the third (tread Z) is of the multipurpose (all-season) type, the fourth (tread V) is of the multipurpose type and the fifth (tread W) is of the multipurpose type.

The tyres were mounted on standard rims and inflated to the recommended working pressure.

The results of the various tests are given below.

Test I

Tractional Power on Snow

The test was carried out on the tyre of the invention shown in FIGS. 1–3, labelled C, compared with tyres with treads X, Y and Z.

In particular, the size of the tyre of the invention was 225/55 R17, which is not conventional for a multipurpose tyre and was specially designed, on request, for a motor vehicle manufacturer.

The size of the tyres with treads X, Y and Z was 225/60 R16, i.e. the closest size to that of the tyre of the invention, in order to be able to carry out meaningful comparative tests. In particular, their diameter was equal to that of the tyre of the invention.

The motor vehicle was an Audi "Hunter" 4×4 road prototype.

The test was carried out on a track covered with a layer of compact snow, prepared on the surface of a frozen lake.

The tests of tractional power on snow consisted of standing starts (accelerations) carried out in first gear with clutch engaged. By keeping the engine speed constant (4000 or 5000 revs/min), the acceleration/force tractional power curve (the mass of the motor vehicle being known) was obtained as a function of slip. In the curve, the area subtended by two predefined intervals of slip and the maximum value of the curve were considered.

Other tests consisted of starting from stationary in order to obtain the time and the average acceleration required to reach a predetermined velocity.

The maximum tractional power force (N) was measured and was expressed as a maximum percentage force ($F_{max}\%$) relative to the maximum tractional power force of a reference tyre taken as equal to 100. The integral of the force between 5 and 50% of slipping ($F_{5-50}\%$) was also calculated.

The results of the abovementioned tests are given in Table I below.

TABLE I

|  | C | X | Z | Y |
|---|---|---|---|---|
| $F_{max}\%$ | 124.7 | 100 | 126.3 | 168.4 |
| $F_{5-50}\%$ | 118.1 | 100 | 122.7 | 166.7 |

These results show that the tractional power of the tyre of the invention (C) is substantially equivalent to that of the best commercially available multipurpose tyre (Z), is much better than that of the summer type reference tyre (X), and is only inferior to that of the winter tyre (Y).

The modest difference in the values of the tractional power force for the tyre of the invention (C) relative to those of the conventional multipurpose tyre (Z) is explained by the difference of the size (the tyre of the invention is of lower profile and thus more rigid) and by fewer sipes on the outer side. The result of the test on snow is therefore penalized relative to the comparative tyre.

Test II

Braking on Snow

The experimental conditions were the same as those in Test I, except that the deceleration (in m/sec$^2$) of the car from a velocity of between 50 and 10 km/h was measured and was expressed as a percentage deceleration (a %) relative to the deceleration of a reference tyre taken as equal to 100.

The tests of braking on snow were carried out using the antilock braking system (antiskid or ABS system), starting from an initial velocity, for example, of 50 or 40 km/h, and ignoring the final 10 or 5 km/h.

The braking distances and the average decelerations were calculated.

The results are given in Table II below.

TABLE II

|  | C | X | Z |
|---|---|---|---|
| a% | 124.5 | 100 | 126.4 |

These results show that the braking of the tyre of the invention (C) is substantially equivalent to that of the best commercially available multipurpose tyre (Z) and is considerably superior to that of the reference tyre, of summer type (X).

Test III

Behaviour on Dry Terrain and Tests under Aquaplaning Conditions

With the Audi 4×4 road car fitted with the tyres described in Test I above, the behaviour on dry terrain and under aquaplaning conditions in a straight line and on a curve were evaluated.

The straight-line aquaplaning test was carried out on a straight section of smooth asphalt of predetermined length with a layer of water of constant predetermined depth which was replaced automatically after each passage of the test car.

The test of aquaplaning on a curve was carried out on a section of track with smooth, dry asphalt on a curve of constant radius with a predetermined length and comprising, in a final section, a zone of predetermined length flooded with a layer of water of predetermined depth.

The results are shown in Table III below.

TABLE III

|  | C | X | Z |
|---|---|---|---|
| Noise (1) | 7–8 | 7–8 |  |
| Noise (2) | O.K. | O.K. |  |
| Handling (3) | 98.1% | 100% | 95.1% |
| Steering pad (3) | 98.8% | 100% | 97.7% |
| Aquaplaning on a curve (4) | 89.0% | 100% | 93.2% |

TABLE III-continued

|  | C | X | Z |
|---|---|---|---|
| Aquaplaning in a straight line (5) | 92.8% | 100% | 97.9% |
| Aquaplaning on a curve (6) | 72.4% | 100% |  |
| Aquaplaning in a straight line (7) | 93.5% | 100% | 103.5% |
| Braking (8) | 98.3% | 100% | 95.5% |
| Handling (9) |  |  |  |
| Steering-accuracy | 6.5–7.5 | 7–7.5 | 7 |
| Stability | 7.5–8 | 7–7.5 | 6.5–7 |
| Driving comfort | 7.5–8 | 7.5 | 7–7.5 |

(1) Subjective evaluation
(2) Semi-anechoic chamber. "O.K." is the verdict of the expert after studying the graphs of the test.
(3) Behaviour on wet asphalt
(4) Maximum speed achievable in a curve
(5) Initial aquaplaning speed
(6) Maximum transverse acceleration
(7) Speed of total aquaplaning (no adhesion)
(8) Braking under wet conditions (stopping distance in metres)
(9) On dry terrain These results show that the tyre of the invention exhibits behaviour under dry and wet conditions, in particular a track stability, which is virtually of the same level as that of a summer tyre (X), although it has a tread of clearly multipurpose type. Specifically, it can be seen that these results are overall better than those of the best multipurpose reference tyre (Z), except in the aquaplaning tests, for the reason already explained with reference to Test I, i.e. on account of the lower profile of the tyre of the invention which has a wider imprint area and is thus more susceptible to aquaplaning.

Test IV

Tractional Power on Snow

The test was carried out on the tyres of the invention shown in FIGS. 7 and 8 compared with tyres of multipurpose type with treads V and W. All the tyres tested were of the size 205/55 R16.

In particular, the tyres of the invention were labelled as follows:

E: FIGS. 7 and 8;
Base (1st variant): tread pattern of FIGS. 7–8, but without sipes (FIG. 9);
E1 (2nd variant): tread pattern of FIGS. 7–8, but with different sipes (FIG. 10);
E2 (3rd variant): tread pattern of FIGS. 7–8, but with different sipes (FIG. 11).

All the tyres of the invention had a tread made of the same compound.

The tests were carried out using a Mercedes Benz C280 car weighing 1490 kg and fitted with ABS.

The test conditions were the same as those described in Test I above.

The results of the test of tractional power on snow are given in Table IV.

TABLE IV

|  | Base | E | E1 | E2 | W | V |
|---|---|---|---|---|---|---|
| $F_{max}$% | 100.0 | 125.2 | 145.7 | 141.9 | 115.1 | 107.9 |
| $F_{5-50}$% | 100.0 | 141.8 | 164.2 | 161.7 | 130.3 | 120.6 |

These results show that the tractional power properties of the treads E, E1 and E2 of the invention are better than those of both the comparative tyres.

Test V

Braking under Wet Conditions

The car was that of Test IV fitted with tyres with a tread of the invention of type E and comparative tyres of type W. The results are given in Table V below.

TABLE V

|  | E | W |
|---|---|---|
| A% | 100.0 | 96.9 |

These results show that the tread E of the invention gives better results than the comparative tread of W type.

Test VI

Aquaplaning in a Straight Line

The test was carried out as described above (Test III). At first, the speed (km/h) of initial loss of adhesion of the tyres (V. init.) was recorded, then the speed (km/h) of total loss of adhesion (V. end) was recorded.

The aquaplaning test was carried out using a Mercedes Benz C280 car fitted with tyres of the E type of the invention and comparative tyres of the V and W type.

The results of the test are shown in Table VI

TABLE VI

|  | E | W | V |
|---|---|---|---|
| V. init. | 76.6 | 74.6 | 71.8 |
| V. end | 82.5 | 79.2 | 77.0 |

These results show that the straight-line aquaplaning properties of the tyre with the tread E of the invention are better than those of the comparative tyres.

The invention claimed is:

1. A multipurpose tyre for a motor vehicle, comprising:
a tread;
wherein the tread comprises a first shoulder region, a central region, and a second shoulder region,
wherein a first circumferential groove separates the central region from the first shoulder region,
wherein a second circumferential groove separates the central region from the second shoulder region,
wherein the central region comprises at least a first row of blocks and a second row of blocks,
wherein the first row of blocks and the second row of blocks are arranged between an equatorial plane of the tyre and either the first circumferential groove or the second circumferential groove,
wherein the first row of blocks is separated from the second row of blocks by first oblique grooves, extending in a first oblique direction relative to the equatorial plane of the tyre, and second oblique grooves, extending in a second oblique direction relative to the equatorial plane of the tyre,
wherein each first oblique groove is connected to a second oblique groove at a first essentially T-shaped junction,
wherein each first oblique groove is connected to another second oblique groove at a second essentially T-shaped junction,
wherein at the first essentially T-shaped junction, a first angle on the axially outer side of the first oblique groove between the first oblique direction, toward the second essentially T-shaped junction, and the second oblique direction, along the second oblique groove, is greater than or equal to about 95° and less than or equal to about 115°, wherein at the second essentially T-shaped junction, a second angle on the axially inner side of the first oblique groove between the first oblique direction, toward the first essentially T-shaped junction, and the second oblique direction, along the another second oblique groove, is greater than or equal to about 95° and less than or equal to about 115°, wherein at least two blocks of the first row are separated from each other, at least in part, by a third oblique groove extending in a direction substantially parallel to the second oblique direction, wherein the third oblique groove is connected to one of the first oblique grooves at an end of the first oblique groove nearest the equatorial plane of the tyre, and wherein the third oblique groove ends at the end of the one first oblique groove so as to form an elbow join.

2. The tyre of claim 1 wherein the central region further comprises at least a third row of blocks and a fourth row of blocks, wherein the third row of blocks and the fourth row of blocks are arranged between the equatorial plane of the tyre and either the first circumferential groove or the second circumferential groove, on an opposite side of the equatorial plane of the tyre from the first row of blocks and the second row of blocks, wherein the third row of blocks is separated from the fourth row of blocks by fourth oblique grooves, extending in a third oblique direction relative to the equatorial plane of the tyre, and fifth oblique grooves, extending in a fourth oblique direction relative to the equatorial plane of the tyre, wherein each fourth oblique groove is connected to a fifth oblique groove at a third essentially T-shaped junction, wherein each fourth oblique groove is connected to another fifth oblique groove at a fourth essentially T-shaped junction, wherein at the third essentially T-shaped junction, a third angle on the axially outer side of the fourth oblique groove between the third oblique direction, toward the fourth essentially T-shaped junction, and the fourth oblique direction, along the fifth oblique groove, is greater than or equal to about 95° and less than or equal to about 115°, wherein at the fourth essentially T-shaped junction, a fourth angle on the axially inner side of the fourth oblique groove between the third oblique direction, toward the third essentially T-shaped junction, and the fourth oblique direction, along the another fifth oblique groove, is greater than or equal to about 95° and less than or equal to about 115°, wherein at least two blocks of the third row are separated from each other, at least in part, by a sixth oblique groove extending in a direction substantially parallel to the fourth oblique direction, and wherein the sixth oblique groove is connected to one of the fourth oblique grooves at an end of the fourth oblique groove nearest the equatorial plane of the tyre.

3. The tyre of claim 2, wherein the central region further comprises a circumferential rib, a third circumferential groove, and a fourth circumferential groove, wherein the fourth circumferential groove separates the circumferential rib from the third row of blocks, and wherein the fourth circumferential groove is in communication with the second circumferential groove via one or more second transverse zigzag paths comprising the fourth oblique grooves, the fifth oblique grooves, and the sixth oblique groove.

4. The tyre of claim 2, wherein at least two blocks of the third row are separated from each other, at least in part, by a second sipe extending in a direction substantially parallel to the fourth oblique direction, and wherein the second sipe is connected to one of the fourth oblique grooves at an end of the fourth oblique groove nearest the equatorial plane of the tyre.

5. The tyre of claim 2, wherein the fourth oblique grooves comprise a width that decreases in a direction toward the equatorial plane of the tyre.

6. The tyre of claim 2, wherein the blocks of the third row and the blocks of the fourth row are side-by-side, wherein the blocks of the third row diverge obliquely from the blocks of the fourth row, and wherein the blocks of the third row and the blocks of the fourth row are inclined in a direction opposite, relative to the equatorial plane of the tyre, to the blocks of the first row and the blocks of the second row.

7. The tyre of claim 2, wherein the blocks of the third row comprise two portions that extend obliquely relative to each other, and wherein the blocks of the third row further comprise an overall shape resembling that of a numeral 1.

8. The tyre of claim 2, wherein the blocks of the fourth row are essentially trapezoid-shaped.

9. The tyre of claim 2, wherein a width of the second oblique grooves is greater than a width of the fifth oblique grooves.

10. The tyre of claim 2, wherein an area of the blocks of the first row is substantially equal to an area of the blocks of the third row, and wherein an area of the blocks of the second row is substantially equal to an area of the blocks of the fourth row.

11. The tyre of claim 2, wherein an area of the blocks of the first row is substantially less than an area of the blocks of the third row, and wherein an area of the blocks of the second row is substantially less than an area of the blocks of the fourth row.

12. The tyre of claim 2, wherein each block of the third row includes no sipes.

13. The tyre of claim 2, wherein each block of the fourth row is substantially trapezoid-shaped, and wherein each block of the fourth row comprises a sixth sipe that is substantially trapezoid-shaped.

14. The tyre of claim 2, wherein each block of the third row comprises three seventh sipes that are substantially parallel to the fourth oblique direction.

15. The tyre of claim 2, wherein each block of the fourth row comprises two eighth sipes that are substantially parallel to the fourth oblique direction.

16. The tyre of claim 2, wherein each block of the third row comprises two thirteenth sipes that are substantially parallel to the fourth oblique direction, and wherein each block of the third row further comprises a fourteenth sipe that is substantially S-shaped.

17. The tyre of claim 2, wherein each block of the fourth row comprises a fifteenth sipe that is substantially S-shaped, wherein each block of the fourth row further comprises two sixteenth sipes that are substantially parallel to the fourth oblique direction, and wherein the two sixteenth sipes are located on either side of the fifteenth sipe.

18. The tyre of claim 2, wherein the central region further comprises a circumferential rib, a third circumferential groove, and a fourth circumferential groove,
wherein the circumferential rib comprises a seventeenth sipe that is substantially parallel to the second oblique direction, and
wherein the circumferential rib further comprises an eighteenth sipe that is substantially parallel to the fourth oblique direction.

19. The tyre of claim 1, wherein the central region further comprises a circumferential rib, a third circumferential groove, and a fourth circumferential groove.

20. The tyre of claim 19, wherein the third circumferential groove separates the circumferential rib from the first row of blocks, and
wherein the third circumferential groove is in communication with the first circumferential groove via one or more first transverse zigzag paths comprising the first oblique grooves, the second oblique grooves, and the third oblique groove.

21. The tyre of claim 19, wherein a width of the third circumferential groove is greater than a width of the first circumferential groove, and
wherein a width of the fourth circumferential groove is greater than the width of the first circumferential groove.

22. The tyre of claim 19, wherein a mid-plane of the circumferential rib is coplanar with the equatorial plane of the tyre.

23. The tyre of claim 19, wherein a mid-plane of the circumferential rib is not coplanar with the equatorial plane of the tyre.

24. The tyre of claim 1, wherein at least two blocks of the first row are separated from each other, at least in part, by a first sipe extending in a direction substantially parallel to the second oblique direction, and
wherein the first sipe is connected to one of the first oblique grooves at an end of the first oblique groove nearest the equatorial plane of the tyre.

25. The tyre of claim 1, wherein the first oblique grooves comprise a width that decreases in a direction toward the equatorial plane of the tyre.

26. The tyre of claim 1, wherein the blocks of the first row and the blocks of the second row are side-by-side, and
wherein the blocks of the first row diverge obliquely from the blocks of the second row.

27. The tyre of claim 1, wherein the blocks of the first row comprise two portions that extend obliquely relative to each other, and
wherein the blocks of the first row further comprise an overall shape resembling that of a numeral 1.

28. The tyre of claim 1, wherein the blocks of the second row are essentially trapezoid-shaped.

29. The tyre of claim 1, wherein a width of the first circumferential groove is greater than a width of the second circumferential groove.

30. The tyre of claim 1, wherein each block of the first row comprises two third sipes that are substantially parallel to the second oblique direction, and
wherein each block of the first row further comprises a fourth sipe that is essentially hook-shaped, with sides extending in directions substantially parallel to the first oblique direction and the second oblique direction.

31. The tyre of claim 1, wherein each block of the second row comprises three fifth sipes that are substantially parallel to the second oblique direction.

32. The tyre of claim 1, wherein each block of the first row comprises a ninth sipe that is substantially parallel to the second oblique direction, and
wherein each block of the first row further comprises a tenth sipe that is substantially S-shaped.

33. The tyre of claim 1, wherein each block of the second row comprises an eleventh sipe that is substantially S-shaped,
wherein each block of the second row further comprises two twelfth sipes that are substantially parallel to the second oblique direction, and
wherein the two twelfth sipes are located on either side of the eleventh sipe.

34. The tyre of claim 1, wherein the first shoulder region comprises a fifth row of blocks,
wherein the blocks of the fifth row are separated from each other by ninth grooves,
wherein the ninth grooves are substantially transverse relative to the equatorial plane of the tyre,
wherein the ninth grooves are in communication with the first circumferential groove,
wherein the second shoulder region comprises a sixth row of blocks,
wherein the blocks of the sixth row are separated from each other by tenth grooves,
wherein the tenth grooves are substantially transverse relative to the equatorial plane of the tyre, and
wherein the tenth grooves are in communication with the second circumferential groove.

35. The tyre of claim 34, wherein each ninth groove comprises a connecting portion with an opening that is substantially eccentric relative to the second oblique grooves.

36. The tyre of claim 34, wherein each tenth groove comprises a connecting portion with an opening that is substantially concentric with a fifth oblique groove.

37. The tyre of claim 34, wherein a width of the ninth grooves is greater than a width of the tenth grooves.

38. The tyre of claim 34, wherein each block of the fifth row comprises three nineteenth sipes that are substantially transverse relative to the equatorial plane of the tyre.

39. The tyre of claim 34, wherein each block of the sixth row comprises a twentieth sipe that is substantially transverse relative to the equatorial plane of the tyre.

40. The tyre of claim 34, wherein each block of the sixth row comprises three twenty-first sipes that are substantially transverse relative to the equatorial plane of the tyre.

41. The tyre of claim 34, wherein each block of the fifth row comprises two twenty-second sipes that are substantially transverse relative to the equatorial plane of the tyre,
wherein each block of the fifth row further comprises two twenty-third sipes that are substantially parallel to the equatorial plane of the tyre, and
wherein each twenty-second sipe is connected to a twenty-third sipe.

42. The tyre of claim 34, wherein each block of the sixth row comprises a twenty-fourth sipe that is substantially S-shaped,
wherein each block of the sixth row further comprises two twenty-fifth sipes that are substantially transverse relative to the equatorial plane of the tyre, and
wherein the two twenty-fifth sipes are located on either side of the twenty-fourth sipe.

* * * * *